United States Patent [19]
Brooks et al.

[11] Patent Number: 5,146,450
[45] Date of Patent: Sep. 8, 1992

[54] METHOD AND APPARATUS FOR BEARING TO COMB ATTACHMENT

[75] Inventors: Peter E. Brooks; John R. Reidenbach; Mark E. Troutman, all of Rochester, Minn.

[73] Assignee: International Business Machines Corporation, Armonk, N.Y.

[21] Appl. No.: 532,307

[22] Filed: Jun. 1, 1990

[51] Int. Cl.⁵ ............... G11B 17/00; G11B 21/16; G11B 17/02; G11B 5/54
[52] U.S. Cl. .................... 369/244; 369/255; 360/99.08; 360/99.09; 360/105; 360/107
[58] Field of Search ............... 369/244, 255; 360/105, 360/106, 107, 97.01, 99.08, 99.09, 99.11

[56] References Cited

U.S. PATENT DOCUMENTS

| | | | |
|---|---|---|---|
| 4,449,216 | 5/1984 | Kudo et al. | 369/255 |
| 4,544,972 | 10/1985 | Kogure et al. | 360/105 |
| 4,703,470 | 10/1987 | Castagna et al. | 369/247 |
| 4,713,703 | 12/1987 | Asano | 360/106 |
| 4,796,122 | 1/1989 | Levy et al. | 360/106 |
| 4,851,943 | 7/1989 | Perry | 360/105 |
| 4,879,617 | 11/1989 | Sampietro | 360/105 |
| 4,890,176 | 12/1989 | Casey et al. | 360/105 |
| 4,965,684 | 10/1990 | Stefansky | 369/75.1 |

Primary Examiner—John W. Shepperd
Assistant Examiner—Tan Nguyen
Attorney, Agent, or Firm—Richard E. Billion

[57] ABSTRACT

Disclosed is a method and apparatus for attaching a bearing cartridge to an actuator arm assembly in a disk drive. The bearing cartridge includes the actuator shaft, an outer sleeve and a set of bearings. The actuator arm assembly has a bore therein which receives the bearing cartridge. The bearing cartridge is anchored to the actuator arm assembly at a single location.

16 Claims, 5 Drawing Sheets

METHOD AND APPARATUS FOR BEARING TO COMB ATTACHMENT

FIELD OF THE INVENTION

The present invention pertains to the field of disk drives which are also called direct access storage devices (DASD).

More particularly, this invention pertains to the method and apparatus for attaching a bearing cartridge to the comb structure which includes the actuator arms in a disk drive.

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to 45 rpm records used on a record player or compact disks which are used in a CD player. The disks are stacked on a spindle, much like several 45 rpm records awaiting to be played. In a disk drive, however, the disks are mounted to spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Compact disks have tracks as do the disks in a disk drive. The tracks in either the disk drive or the compact disk essentially replace the grooves in a 45 rpm record. Each track in a disk drive is further subdivided into a number of sectors which is essentially just one piece of the track.

Disks in a disk drive are made of a variety of materials. Most commonly, the disk is made of metal or plastic. The material from which the disk is made determines how data is stored on the disk. A plastic disk, such as those used as CD's, stores data using lasers and a laser is used to read the data back. Storage of data on a metal disk entails magnetizing portions of the disk in a pattern which reflects the data.

To store data on a metal disk, the metal disk is magnetized. In order to magnetize the surface of a disk, a small ceramic block which contains a magnetic transducer known as a read/write head is passed over the surface of the disk. More specifically, the read/write head is flown at a height of approximately six millionths of an inch from the surface of the disk and is flown over the track as the read/write head is energized to various states causing the track below to be magnetized to represent the data to be stored.

To retrieve data stored on a magnetic disk, the read/write head is flown over the metal disk. The magnetized portions of the disk induce a current in the read/write head. By looking at output from the read/write head, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read/write head. This would be comparable to having a stereo that could play both sides of a record at once. Each side would have a stylus which played the particular side of the record.

Disk drives also have something that compares to the tone arm of a stereo record player. The tone arm of a disk drive, termed an actuator arm, holds all the read/write heads, one head for each surface of each disk supported in a structure that looks like a comb. The structure is also commonly called an E block. Like a tone arm, the actuator arms rotate so that the read/write heads attached to the actuator arm can be moved to locations over various tracks on the disk. In this way, the read/write heads can be used to magnetize the surface of the disk in a pattern representing the data at one of several track locations or used to detect the magnetized pattern on one of the tracks of a disk.

A shaft and a precision bearing set are attached to the actuator arm to provide for smooth rotational movement of the actuator arm. This particular invention deals with attaching the shaft and bearing to the actuator arm so that play in the actuator arm will be significantly lessened and so that the actuator arm will not be stressed resulting in the read/write heads being positioned out of alignment.

It is important to keep the read/write heads attached to the actuator arm aligned in a disk drive for the following reason. One of the ways to locate particular tracks is to make one surface of one disk a reference surface. Locational information is placed on the reference surface. All of the tracks at the same circumference are identified by referring to the locational information on the reference surface. If the read/write heads get out of alignment, the locational information on the reference surface may indicate that another read/write head is over a particular track when in fact it is over an adjacent track. The result would be that the wrong track may be magnetized or that the wrong track may be read resulting in retrieval of the wrong information. This would be similar to looking into the wrong mailbox and expecting to find your mail.

In the past a shaft and a bearing set were incorporated into the actuator arm. The shaft and bearings are typically made out of one material and the actuator arm is made out of another. When the shaft and bearings were incorporated into the actuator arm, the two materials would expand at different rates as the disk drive heated up during operation. Since the two materials were attached to one another and expanded at different rates, stresses resulted in the actuator arm which positioned the read/write heads out of alignment. An additional problem was that the spacing between the surfaces holding the individual bearings would change as the two materials would expand as the disk drive heated. The bearings would either be constricted so the bearings would bind, or the bearings would become a little looser resulting in less precision bearings.

To solve the problem of the spacing changes between the surfaces holding the bearings, a bearing cartridge was produced. The bearing cartridge includes an outer cylinder, the bearings and the shaft. The components of the bearing cartridge are made out of the same material so that as the bearing cartridge is heated, all of the materials expand at the same rate and the fits between the surfaces adjacent the bearings remain constant. Since the fits remain constant, the bearings do not become loose or become constricted. The attachment of the bearing cartridge to the actuator arm still resulted in the problems of stresses in the actuator arm causing the read/write heads to be positioned out of alignment. This particular invention discloses a method and apparatus for attaching the bearing cartridge to the actuator arm to eliminate or minimize the problem of stress buildup in the actuator arm resulting in misalignment of the read/write heads on the actuator arm.

SUMMARY OF THE INVENTION

Disclosed is a data storage device which has a rotary actuator arm assembly for positioning sliders and heads over the tracks on a stack of disks. The actuator arm assembly includes a bore into which a bearing cartridge is attached at a single location. The bearing cartridge has an outer sleeve, a bearing set, and a shaft. In one embodiment the outer sleeve of the bearing cartridge includes a threaded opening. To attach the bearing cartridge a machine screw is passed through an opening in the actuator assembly and then into the threaded opening in the bearing cartridge. In another embodiment, the outer sleeve has a slot therein. An adhesive is injected into the opening in the actuator assembly and into the slot in the bearing cartridge to attach the bearing cartridge to the actuator assembly.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
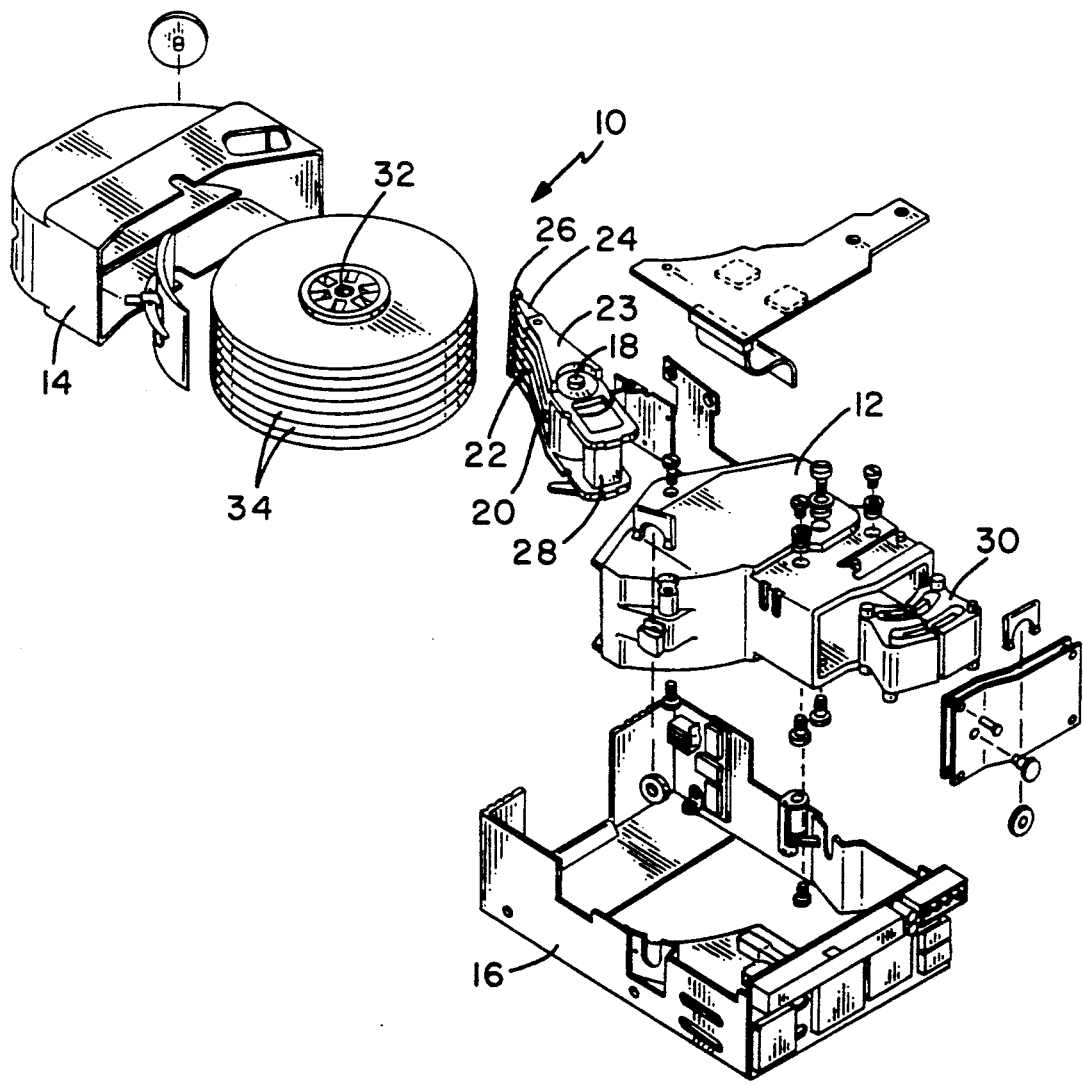
FIG. 1 is an exploded view of a disk drive.

The invention described in this application is useful with all mechanical configurations of disk drives or direct access storage devices ("DASD") having rotary actuation. FIG. 1 is an exploded view of a disk drive 10. The disk drive 10 includes a housing 12, and a housing cover 14 which, after assembly, is mounted within a frame 16. Rotatably attached within the housing 12 on an actuator shaft 18 is an actuator arm assembly 20. The actuator arm assembly 20 includes an E block or comb like structure 22 having a plurality of arms 23. Attached to the separate arms 23 on the comb or E block 22, are load springs 24. Attached at the end of each load spring is a slider 26 which carries a magnetic transducer (not shown in FIG. 1). On the end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation.

Figure 2:
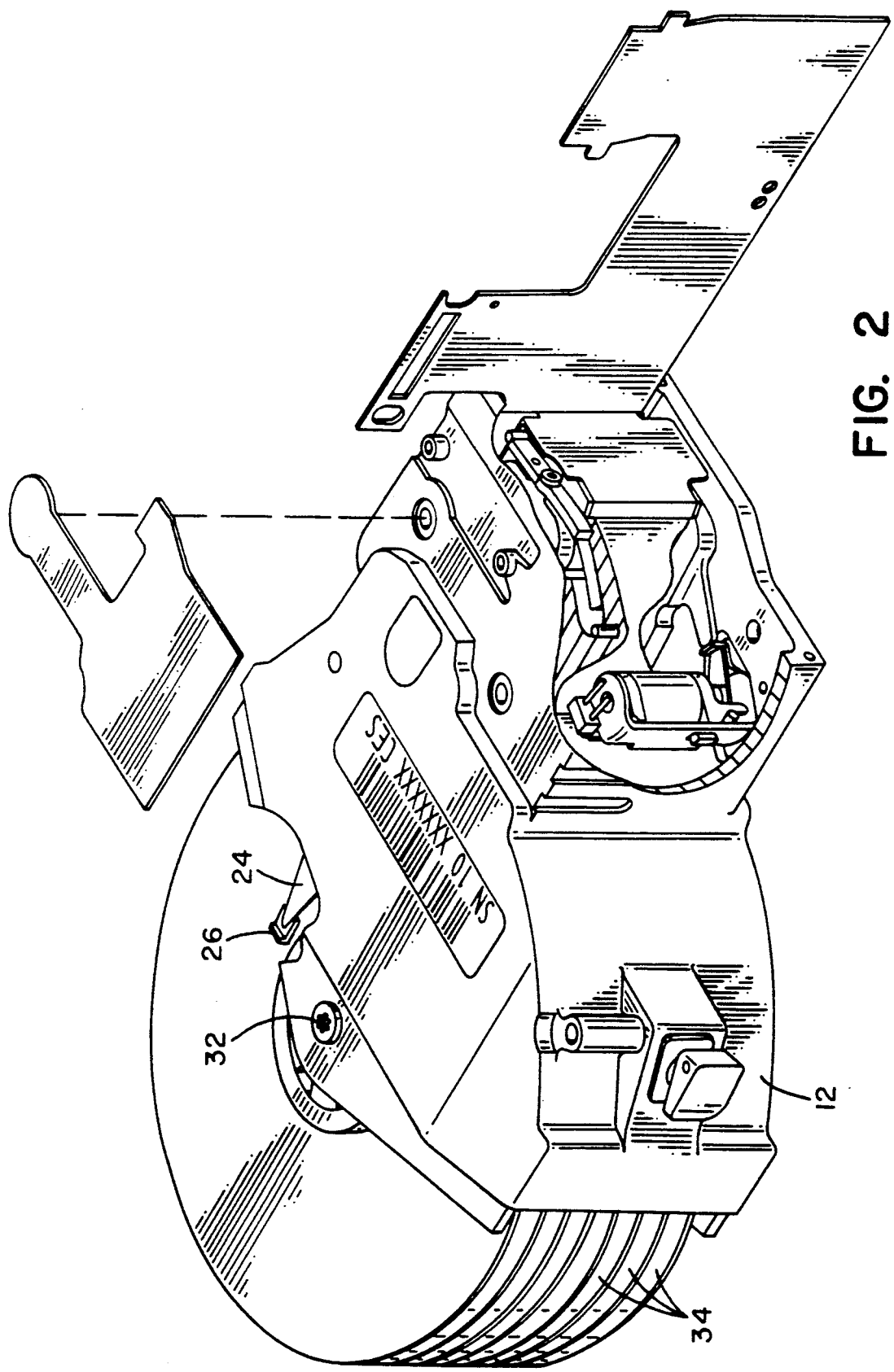
FIG. 2 is a view of an assembled disk drive with a cut away portion and with a portion of the housing removed.

FIG. 2 is a view of the housing 12 with the actuator arm assembly 20 and the spindle shaft 32 mounted therein. Attached to the spindle shaft 32 are the disks 34. Also shown in FIG. 2 is the slider 26 cooperating with one of the disks 34. It should be noted that all of the sliders 26 cooperate with a particular surface of one of the disks 34.

Figure 3:
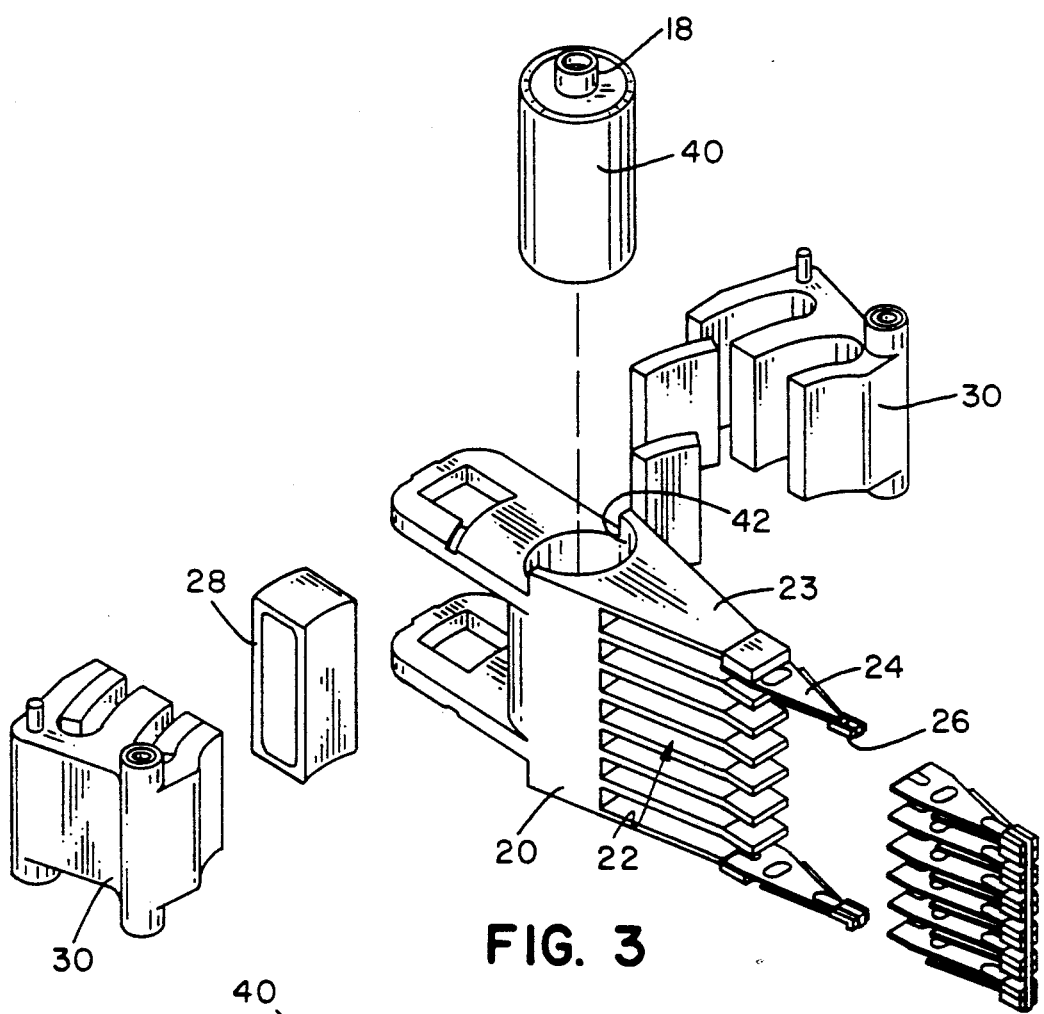
FIG. 3 is an exploded view of the actuator bearing cartridge and the actuator arm assembly.

FIG. 3 details the actuator arm assembly 20 in an exploded view. Each of the arms 23 of the E block or comb assembly 22, except the arms 23 on the top and bottom of the E block 22, carry two load springs. In this particular disk drive 10, there is a slider for both the top and bottom surface of each of the disks 34. The top and bottom fingers of the E block 22 have only one load spring 24 since these are used for the top surface of the top disk and the bottom surface of the bottom disk in the stack of disks 34. Attached to the load springs 24 are sliders 26 which include magnetic transducers which magnetize the surface of the disk 34 to represent and store desired data. As is well known in the art of disk drives, each of the disks has a series of concentric tracks onto which the magnetic information is recorded. The sliders 26 and the magnetic transducers incorporated therein are moved over the surface of a particular disk 34 so that a magnetic representation of data can be stored in any of the tracks on the disk 34. In this particular disk drive 10, the transducer movement is rotational and about the actuator shaft 18. Rotating the actuator arm assembly 20 causes the slider 26 and the transducer therein to be repositioned over surface of the disk 34.

FIG. 3 also shows that the actuator arm assembly 20 includes a bearing cartridge 40. The bearing cartridge is cylindrical in shape and includes the actuator shaft 18 about which the actuator arm assembly rotates. The actuator arm assembly 20 has a first opening or bore 42 therein. The bearing cartridge 40 fits within the bore 42 in the actuator arm assembly 20.

Figure 4:
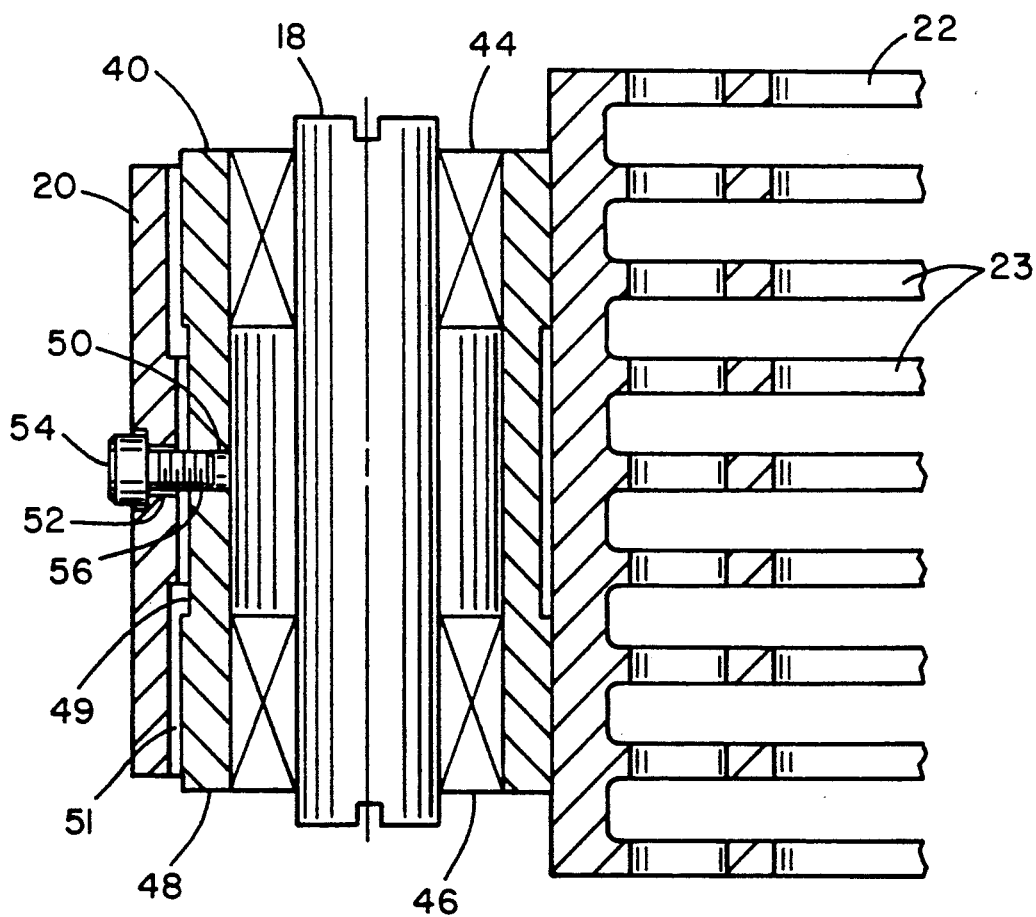
FIG. 4 is sectional view of the actuator bearing cartridge mounted to the actuator arm according to the first embodiment of this invention.

FIG. 4 further details the bearing cartridge 40 and its attachment to the actuator arm assembly 20. The bearing cartridge 40 is comprised of a first bearing set 44, a second bearing set 46, an outer sleeve 48 and the shaft 18. The actuator shaft 18, the first bearing set 44, the second bearing set 46 and the outer sleeve 48 are made of the same material so that when the bearing cartridge 40 is heated during the operation of the disk drive 10, all of the components have the same coefficient of thermal expansion. All the parts of the bearing cartridge will expand due to the increased heat and maintain the same fits between the outer sleeve 48, the first and second bearing sets 44, 46 and the shaft 18.

Figure 5:
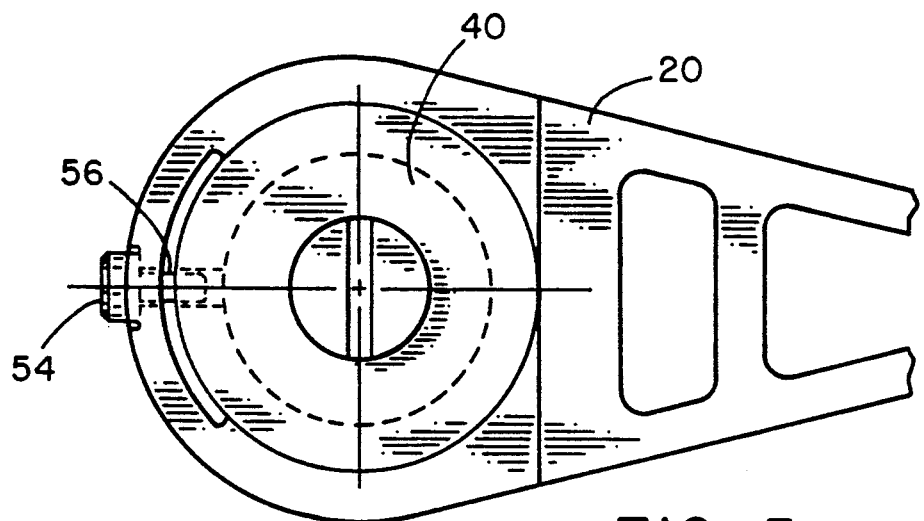
FIG. 5 is a top view of the actuator bearing cartridge mounted to the actuator arm according to the first embodiment of this invention.

FIGS. 4 and 5 show how the bearing cartridge is mated to the actuator arm assembly 22. The bearing cartridge 40 also includes a single threaded opening 50 in the outer sleeve 48 of the bearing cartridge 40. The bearing cartridge 40 can be thought of as having a generally cylindrical shape and the threaded opening 50 is located midway along the height of the cylinder. The threaded opening 50 is also located on a radial from the axis of the cylinder which is also the axis of rotation for the actuator arm assembly 20. The outer sleeve 48 also has a relief 49 therein. This results in a pair of shoulders 51 at the ends of the outer sleeve 48.

A second opening 52 is located in the actuator arm assembly 20. The second opening 52 is located at half the height of the cylinder defined by the first opening 42 in the actuator arm assembly 20. The second opening 52 is also located on a radial of the axis of rotation of the actuator arm assembly 20. The second opening 52 in the actuator arm assembly 20 is located opposite the arms 23 of the E block or comb portion 22 of the actuator arm assembly 20. More precisely, the second opening 52 is located on the actuator arm assembly 20 so that where it intersects with the bore 42 is the most distant portion of the bore 42 from the individual arms in the E block 22.

Attaching the bearing cartridge 40 to the actuator arm assembly is done by inserting the beaming cartridge 40 into the bore 42 in the actuator arm assembly 20. The threaded opening 50 in the outer sleeve 48 of the bearing cartridge 40 is aligned with the second opening 52 in the actuator arm assembly 20. A machine screw 54 is then passed through the second opening 52 in the actuator arm assembly and screwed into the threaded opening 50 in the bearing cartridge 40. To eliminate play in this threaded connection, an adhesive is placed in the second opening 52 of the actuator arm assembly 20 before the machine screw is placed in the second opening 52. As the machine screw is screwed into the threaded opening 50 in the bearing cartridge 40 it passes through the adhesive and fills the gaps in the threads of the threaded opening 50. In addition, the adhesive also fills any gaps remaining between the second opening 52 and the machine screw 54 after the machine screw 54 is tightened.

As the machine screw 54 is tightened, the bearing cartridge 40 is drawn toward the wall or edge of the bore 42 in the actuator arm assembly 20. The shoulders 51 contact the bore 42 and define the contact geometry between the bore 42 of the actuator assembly 20 and the outer sleeve 48 of the bearing cartridge 40. The shoulders 51 provide mechanical stability upon tightening of machine screw 54. The bearing cartridge 40 is thus attached at a single location 56 to the actuator arm assembly 20. This has several advantages. Among the advantages is that attaching the bearing cartridge at the single location 56 minimizes the stress around the bearing cartridge 40 which in turn eliminates distortions in the arms 23 of the E block or comb structure 22.

The load generated by the machine screw 54 causes the side wall of the actuator arm assembly 20 to flex and develop a spring element between the contact points formed by the bore 42 and the bearing cartridge 40. If the material of the machine screw has the same coefficient of thermal expansion as the actuator arm assembly 20, the load will be independent of temperature. The load induced by the screw is small compared to the forces generated by thermal expansion; therefore the contact points defined by the shoulders 51 and the bore 42 allow slippage of the two surfaces, relative to each other, in both an axial and radial direction. It is important to optimize this reaction load with respect to slippage hysteresis and vibrational frequency response of the system.

In other words, the load on the screw 54 must be selected so that the normal force where the shoulders 51 contact the bore 42 in the actuator assembly 20 are minimized. This minimizes the frictional forces on the shoulders 51, and allows them to slip to accommodate thermal expansion or contraction.

The machine screw 54 serves as an anchor point from which all relative motion emanates. The machine screw's central position helps reduce individual actuator suspension compression changes.

The bearing cartridge will typically be made from a material that has a different coefficient of thermal expansion than the material used for the actuator arm assembly 20. For example, the bearing cartridge may be made of hardened steel which will be very wear resistant while the actuator arm assembly 20 will be made of magnesium or another light material. Hardened steel has a thermal coefficient of expansion approximately one half that of magnesium. When the bearing cartridge 40 is attached at a single location the bearing cartridge can expand both linearly and axially without interfering with the actuator arm assembly 20.

Figure 6:
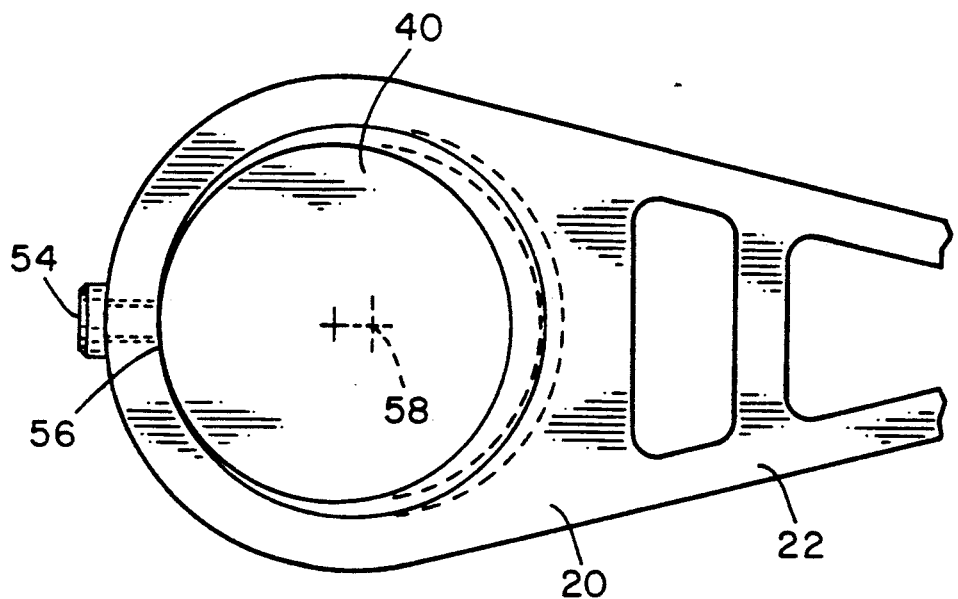
FIG. 6 is an exaggerated top view of the actuator bearing cartridge mounted to the actuator arm according to the first embodiment of this invention.

FIG. 6 is an exaggerated view of what happens as a result of thermal expansion. The solid lines show the bearing cartridge 40 and the actuator arm assembly 20 at a temperature less than operating temperature. The dotted lines show the bearing cartridge at a higher temperature such as the operating temperature of the disk drive. From FIG. 6 it can be seen that as the bearing cartridge 40 and the actuator arm assembly 20 expand radially, the bearing cartridge is able to expand radially as well as the actuator arm assembly without interference between the two components. One effect of the radial expansion is that the axis of rotation of the actuator arm assembly 20 is shifted slightly as indicated by the dotted cross 58. The shifting of the axis of rotation to 58 due to thermal expansion will have virtually no effect on the operation of the disk drive 10. As is well known in the art, one of the disk surfaces is dedicated to locational information. This is known as the servo surface. A shift in the axis of rotation is automatically compensated for since the head and the slider associated with the servo surface will continue to track the desired track after the shift in the axis of rotation.

Similarly, in the axial direction the bearing cartridge 40 will expand less than the actuator arm assembly 20. Stresses resulting from expansion in the axial direction will be minimized since the cartridge is attached at the one location 56. Since there is only one location the cartridge can expand between the threaded opening 50 and the top or bottom of the bearing cartridge 40. Since the stresses are minimized, the sliders 26 and heads carried by the sliders 26 remain in alignment after thermal expansion takes place.

Another advantage associated with the embodiment shown in FIGS. 4–6 is that the process of threading the machine screw 54 into the threaded opening 50 after placing an adhesive in the second opening 52 is a self fixturing process. Generally, when an adhesive is used to attach the bearing cartridge 40 to the actuator arm assembly 20 the actuator arm assembly 20 must be placed in a fixture to allow the adhesive time to cure. When using the first embodiment described above, the machine screw 54 engaged with the threaded opening 50 in the bearing cartridge 40 holds the assembled parts together while the adhesive sets.

Figure 7:
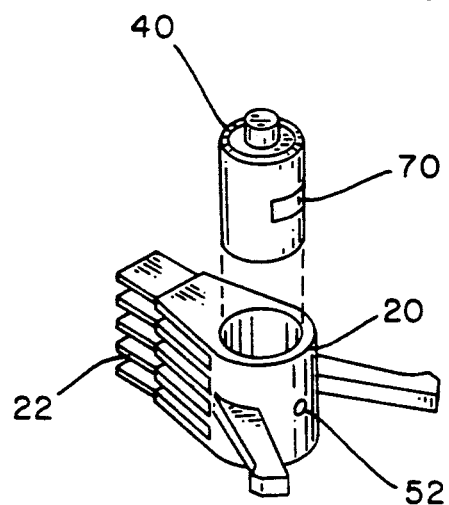
FIG. 7 is an exploded view of the actuator bearing cartridge mounted and the the actuator arm according to the second embodiment of this invention.

FIG. 7 shows a second embodiment of the invention in an exploded view. In the second embodiment, the bearing cartridge 40 is provided with a slot 70. The actuator arm assembly 40 still has the second opening 52. The slot 70 is located so that it corresponds to the location of the second opening 52 when the bearing cartridge 40 is placed into the bore 42 of the actuator arm assembly 40. The slot 70 is located about midway along the height of the bearing cartridge 40. An adhesive is injected into the second opening 52 to fill the cavity created between the bearing cartridge 40 and actuator arm assembly 20 by the slot 70. The adhesive selected for the second embodiment has a relative thermal expansion which is greater than the difference in the thermal expansions of the bearing cartridge 40 and the actuator arm assembly 20.

Figure 8:
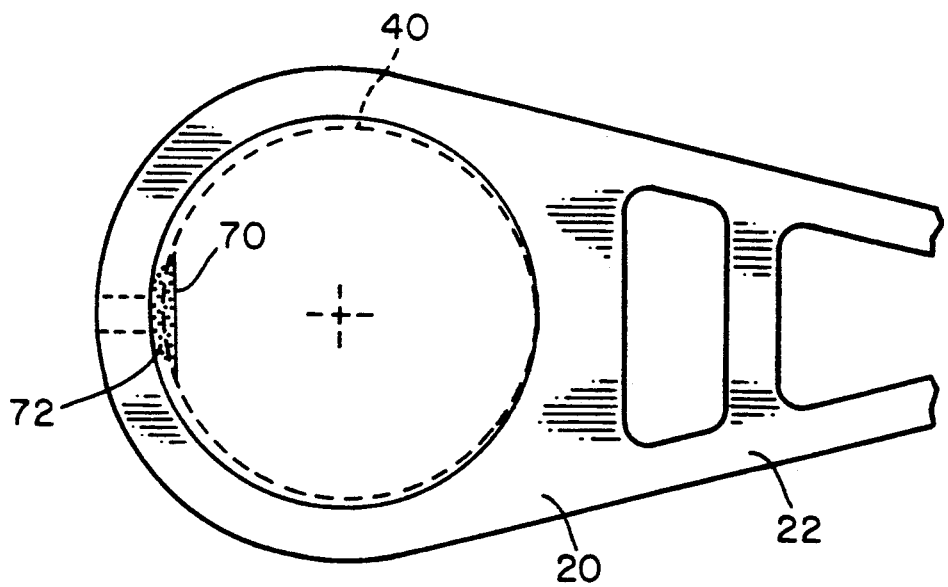
FIG. 8 is an exaggerated top view of the actuator bearing cartridge mounted to the actuator arm according to the second embodiment of this invention.

The second embodiment works differently than the first embodiment as shown by FIG. 8. FIG. 8 shows the bearing cartridge after it has reached operating temperature or after thermal expansion has taken place. The adhesive 72 would expand and hold the bearing cartridge against the wall of bore 42 near the E block or comb assembly. However, the bearing cartridge 40 and the actuator assembly 20 would be able to expand relative to one another since the bearing cartridge is attached at a single location which is defined by the slot 70 and the second opening 52. The bearing cartridge 40 is allowed to expand both radially and axially except at the location of the bond.

The present invention and the best modes of practicing it have been described. It is to be understood that the foregoing description is illustrative only and that other means and techniques can be employed without departing from the full scope of the invention as described in the appended claims.

What is claimed is:

1. A data storage device which comprises:
   an actuator arm assembly having a bore therein;
   a bearing cartridge which further includes:
      a shaft;
      an outer sleeve; and
      bearing sets positioned between the shaft and the outer sleeve, said bearing cartridge inserted within the bore of the actuator arm assembly; and
   means for anchoring the bearing cartridge to the actuator arm at a single location.

2. The data storage device of claim 1 wherein said bearing cartridge has a threaded opening in the outer sleeve and wherein said actuator arm assembly has an opening which intersects with the bore, said means for anchoring the bearing cartridge to the actuator arm at a single location further comprising a fastener passed through the opening in the actuator arm assembly and threaded into the threaded opening in the outer sleeve.

3. The data storage device of claim 2 wherein said means for anchoring the bearing cartridge at a single location further comprises an adhesive between the threaded opening and the fastener and an adhesive between the opening in the actuator arm and the fastener.

4. The data storage device of claim 3 wherein the opening in the actuator arm assembly is located at half the height of the bore and the threaded opening in the bearing cartridge is located at half the height of the bearing cartridge.

5. The data storage device of claim 2 wherein the actuator arm assembly further includes a comb structure having a plurality of arms, said opening in the actuator arm assembly intersecting the bore where the opening is most distant from the comb structure.

6. The data storage device of claim 1 wherein said bearing cartridge has a slot in the outer sleeve and wherein said actuator arm assembly has an opening which intersects with the bore, said means for anchoring the bearing cartridge to the actuator arm at a single location further comprising an adhesive within the slot and within the opening in the actuator arm assembly.

7. The data storage device of claim 6 wherein the adhesive within the slot and within the opening in the actuator arm assembly has a relative thermal expansion which is greater than the difference between the relative thermal expansion for the bearing cartridge and the relative thermal expansion of the actuator arm assembly.

8. The data storage device of claim 7 wherein the opening in the actuator arm assembly is located at half the height of the bore and the threaded opening in the bearing cartridge is located at half the height of the bearing cartridge.

9. The data storage device of claim 6 wherein the actuator arm assembly further includes a comb structure having a plurality of arms, said opening in the actuator arm assembly intersecting the bore where the opening is most distant from the comb structure.

10. A method for anchoring a bearing cartridge which includes a shaft, an outer sleeve and a set of bearings to a rotary actuator arm assembly of a data storage device which includes a comb structure having a plurality of arms, a bore for receiving the bearing cartridge, an opening in the actuator assembly which intersects the bore, said method comprising the steps of:
   inserting the bearing cartridge into the bore of the actuator arm assembly; and
   anchoring the bearing cartridge to the actuator arm assembly at a single location, said single location defined by the opening in the actuator arm assembly which intersects the bore.

11. The method of claim 10 wherein the bearing cartridge has a threaded opening in the outer sleeve, the location of said threaded opening corresponding to the location of the opening in the actuator arm assembly which intersects the bore, said anchoring step further comprising the steps of:
   passing a fastener through the opening in the actuator arm assembly; and
   threading the fastener into the threaded opening in the outer sleeve of the bearing cartridge.

12. The method of claim 11 wherein the anchoring step further comprises the step of placing an adhesive in the opening in the actuator arm before passing the fastener through the opening.

13. The method of claim 10 wherein the bearing cartridge has a slot in the outer sleeve, the location of said slot corresponding to the location of the opening in the actuator arm assembly which intersects the bore, said anchoring step further comprising the step of injecting a selected amount of adhesive into the opening of the actuator arm, said selected amount of adhesive filling the slot and the opening in the actuator arm assembly.

14. An apparatus for storing data comprising:
   a housing;
   a spindle shaft attached to the housing;
   a plurality of disks attached to the spindle shaft each of the disks held a selected distance from the other disks attached to the shaft;

an actuator arm assembly having a cylindrical bore therein and having an opening the axis of which is a radial from the cylindrical bore, the actuator arm assembly further including:

a plurality of arms on one end of the actuator arm assembly which form a comb structure;

load springs attached to each of the arms;

sliders attached to each of the load springs and carrying transducers for recording representations of data on the disks; and a bearing cartridge which includes an actuator shaft, an outer sleeve and a set of bearings, the bearing cartridge positioned within the bore of the actuator arm, the outer sleeve of the bearing cartridge anchored to the side wall of the bore at a single location and the actuator shaft attached to the housing.

15. The apparatus of claim 14 wherein the outer sleeve of the bearing cartridge has a threaded opening therein, the bearing cartridge being anchored to side wall of the bore by passing a fastener through the opening in the actuator arm and into the threaded opening in the outer sleeve of the bearing cartridge.

16. The apparatus of claim 14 wherein the outer sleeve of the bearing cartridge has a slot therein, the bearing cartridge being anchored to the side wall of the bore by injecting an adhesive through the opening in the actuator arm and into the slot in the outer sleeve of the bearing cartridge.

* * * * *